United States Patent Office 3,541,084
Patented Nov. 17, 1970

3,541,084
PROCESS FOR SYNTHESIZING SEMISYNTHETIC PENICILLINS USING N-HYDROXY SUCCINIMIDE MONO- AND DICHLOROACETATE ESTERS
Akira Hagitani, Tokyo, Ichiro Muramatsu, Saitama-ken, Shunpei Sakakibara, Kobe-shi, Jinnosuke Abe, Shizuoka-ken, and Tetsuo Watanabe, Musashino-shi, Tokyo, Japan, assignors to Toyo Jozo Kabushiki Kaisha, Takata-gun, Shizuoka-ken, Japan, a corporation of Japan
No Drawing. Filed Sept. 14, 1967, Ser. No. 667,662
Claims priority, application Japan, Sept. 16, 1966, 41/60,768
Int. Cl. C07c 103/04; C07d 27/10, 99/22
U.S. Cl. 260—239.1         1 Claim

ABSTRACT OF THE DISCLOSURE

Process for the manufacture of a compound having the general formula $R_2$—CO—NH—$R_3$ comprising reacting a compound of the general formula

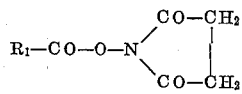

with a compound having the following general formula:

$$R_2\text{—COOH}$$

Reaction occurs in an inorganic solvent at room temperature or below. The succinimide ester product which is formed is reacted with a compound of the following general formula:

$$R_3\text{—NH}_2$$

to yield the product. The second reaction occurs in an inert organic solvent at room temperature or below. The generic moieties shown are fully defined in the specification. The compound produced finds utility in the pharmaceutical field.

---

This invention relates to a process for the manufacture of acid amides. It particularly relates to the process for the production of the compound having the acid amide linkage, said compound having the general formula:

$$R_2\text{—CO—NH—}R_3 \quad\quad (I)$$

wherein $R_2$ stands for a member selected from the group consisting of alkyl, cycloalkyl, alkenyl, cycloalkenyl, aryl, aralkyl, arylalkenyl and heterocyclic carboxyl group; these radicals hereinbefore defined are subsituted or unsubstituted by at least a member selected from the group consisting of halogen, nitro, nitroso, amino, imino, amidino, hydroxy, cycloalkyl, alkoxy, aryloxy, alkoxycarbonyl, alkylcarbonyl, arylcarbonyl, alkylamide, arylamide, alkylthio, alkenyl, cycloalkenyl, alkenylthio, alkenylcarbonyl, aryl, aralkyl, arylalkenyl and heterocyclic group; and $R_3$ stands for a member selected from the group consisting of alkyl, cycloalkyl, aryl, aralkyl, amino, alkylamino, cycloalkylamino, arylamino aralkylamino, alkylamide, cycloalkylamide, alkenylamide, arylamide, aralkylamide, cyclohexylcarboxyamide and cyclohexylamino group; these radicals are substituted or unsubstituted by at least a member selected from the group consisting of halogen, nitro, alkyl, alkoxy, carboxy, alkylcarbonyl, alkylamino, alkylamide, cycloalkyl, alkoxycarbonyl, cycloalkylamine, cycloalkylcarbonyl, cycloalkylamide, alkenyl, cycloalkenyl, alkenylcarbonyl, alkenylamino, alkenylamide, aryl, aralkyl, arylalkenyl, arylamino, arylamide, arylcarbonyl, aralkylcarbonyl, aralkylamino, aralkylamide and heterocyclic group.

It has been proposed previously to produce aforementioned compounds having the general Formula I, especially to produce peptide compounds. As examples of the process for the production of the said compounds, there may be mentioned, for example, a method of using p-nitrophenyl esters of acyl amino acids [M. Bodanszky, Ann. N.Y. Acad. Sci., 88 655 (1960)], N-hydroxyphthalimide method [G. H. L. Nefkens, et al., J. Am. Chem. Soc., 83, 1263 (1961)], and Anderson's method [G. W. Anderson, et al.: J. Am. Chem. Soc.; 86(9), 1939 (1964)] according to which an amino acid, protected in its amino group, is reacted with N-hydroxysuccinimide in the presence of dicyclohexyl carbodimide as a dehydrating agent to a succinimide ester:

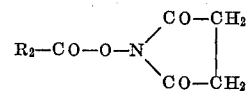

which was then reacted with amino acid to the peptide compound. Among others is known a method by Sakakibara et al. [Bull. Chem. Soc. Japan, 38, 1979 (1965)]. According to this method, trifluoroacetic acid anhydride was reacted with N-hydroxysuccinimide to give the ester, i.e. trifluoroacetoxysuccinimide, being followed by a synthesis to provide the aforementioned succinimide ester, which was then reacted further with amino acid to the peptide compound.

This last mentioned prior process has a number of grave disadvantages, including that the intermediate product or trifluoroacetoxysuccinimide is almost impossible to crystallize and further that this compound and the starting material, the latter being highly poisonous trifluoroacetic acid, are substantially difficult to handle. Also these substances are highly expensive.

The main object of this invention is to provide a process for the production of the compound having acid amide linkage which is useful for a physiologically active agent such as pharmaceuticals and the like.

It is another object of the present invention to provide a process of the above kind, capable of obviating the above mentioned various and grave disadvantages.

In order to realize the above objectives, the process according to the invention in its broadest aspect comprises: reacting a compound having a general formula:

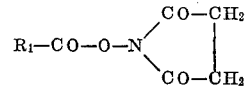

wherein $R_1$ stands for a member selected from the group consisting of hydrogen, monochloroloweralkyl and dichloroloweralkyl group, with a compound having the following general formula:

$$R_2\text{—COOH}$$

wherein $R_2$ has the same meaning as set forth hereinbefore, to provide the succinimide ester compound having the general formula:

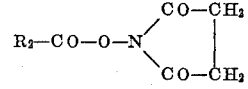

wherein $R_2$ has the meaning set forth above, and subsequently reacting the said succinimide compound with a compound of the following general formula:

$$R_3\text{—NH}_2$$

wherein $R_3$ has the same meaning as set forth hereinbefore, thereby to prepare the desired product expressed in the general Formula I.

Comparing with these conventional methods, the process according to the present invention provides a number of industrial advantages; i.e., succinimide esters as expressed in the general formula:

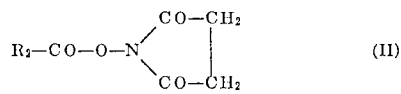

are easily synthesized from N-hydroxysuccinimide esters of the general formula:

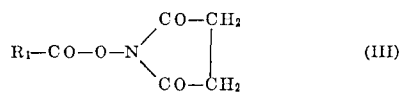

wherein $R_1$ and $R_2$ have respective same meanings as before.

The starting material usable in the novel process is easy to treat, neither hazardous nor expensive.

There is also no necessity for specifically separating the intermediate succinimide ester from reaction mixture, so that the above mentioned compound: $R_3$—$NH_2$ can be added directly thereto, for obtaining the said final compound having the acid amide linkage.

The compound set forth hereinabove, represented by general Formula III, such as formate ester of N-hydroxy succinimide, monochlorofatty acid ester of N-hydroxy succinimide or dichlorofatty acid ester of N-hydroxy succinimide may be used as starting materials. Each of these materials may be prepared by conventional processes, or alternatively by the novel process as disclosed herein.

For carrying out the invention, the process can be carried into effect, for instance, in such a way that an ether solution of formic, monochlorofatty or dichlorofatty acid is partially or completely saturated with ketene to prepare a mixed anhydride of acetic acid-formic acid, -monochlorofatty acid or -dichlorofatty acid, which is then reacted with N-hydroxy succinimide to prepare the starting material. Ordinarily the said N-hydroxy succinimide-formate ester, N-hydroxy succinimide-mono-chlorofatty acid ester or N-hydroxy succinimide-dichlorofatty acid ester produced by the aforementioned process may be used even in their crude form, non-recrystallized.

The reaction between the said N-hydroxy succinimide ester (III) and the said compound: $R_2$—COOH (IV) may be conducted, preferably in an inert organic solvent, such as tetrahydrofuran, dimethylformamide or the like. It may be preferable that the reaction is carried out in the presence of a basic organic solvent e.g., a tertiary amine such as trimethylamine, triethylamine, pyridine or the like. Also the reaction may be conducted at a room- or a reduced-temperature, as may be required. Succinimide esters as expressed by general Formula II resulting from the reaction between the said compound (III) and the said compound (IV) are separated therefrom and of course can be used in the next following reaction step. It is not always necessary, however, to isolate the compound (II), and so aforementioned compound (I) having the acid amide linkage may be obtained without any separating step and thus by reacting the said reaction mixture of the said compound (IV) directly with the compound expressed generally as $R_3$—$NH_2$.

Further it is of course necessary to protect or block the radicals $R_1$ and $R_2$ in aforementioned compounds, if such radicals should be decomposed or affected by undesired change. Amino, hydroxy and the like radicals may be mentioned in this case.

The compound (IV) prepared by the series of the reaction steps may be extracted if desired at controlled pH with a suitable organic solvent such as ethyl acetate, methyl isobutyl ketone or the like. Besides it may be recovered by various conventional processes which are commonly employed in the separation of organic compounds, such as drying-up in vacuo, crystallization from solvents, chromatographic processing and the like technique.

Examples of compounds which correspond to Formulas III and IV and their reaction product succinimide ester (II), forming part of the instant invention, are listed in the following Table 1:

TABLE 1

| Compound (III) | Compound (IV) | Compound (II) |
|---|---|---|
| N-dichloroacetoxy succinimide | Acetic acid | N-acetoxysuccinimide. |
| Do | Acrylic acid | N-acrylyloxysuccinimide. |
| Do | Crotonic acid | N-crotonyloxysuccinimide. |
| Do | Cyclohexanecarboxylic acid | N-cyclohexanoyloxysuccinimide. |
| Do | β-cyclohexylacrylic acid | N-β-cyclohexylacrylyloxysuccinimide. |
| Do | Carbobenzoxyglycine | N-carbobenzoxyglycyloxysuccinimide. |
| Do | Carbobenzoxyvaline | N-carbobenzoxyvalyloxysuccinimide. |
| Do | Carbobenzoxy-L-phenylalanine | N-carbobenzoxy-L-phenylalanyloxysuccinimide. |
| Do | Carbobenzoxy-D-phenylglycine | N-carbobenzoxy-D-phenylglycyloxysuccinimide. |
| Do | α-Methoxyisobutyric acid | N-α-methoxyisobutyloxysuccinimide. |
| Do | Phenylacetic acid | N-phenylacetoxysuccinimide. |
| Do | Capric acid | N-capryloxy-succinimide. |
| Do | Stearic acid | N-stearyloxysuccinimide. |
| Do | Cinnamic acid | N-cinnamoyloxysuccinimide. |
| Do | Isonicotinic acid | N-isonicotinoyloxysuccinimide. |
| Do | Benzoic acid | N-benzoyloxysuccinimide. |
| Do | Carbobenzoxy-L-leucine | N-carbobenzoxy-L-leucyloxysuccinimide. |
| Do | Phenoxyacetic acid | N-phenoxyacetoxysuccinimide. |
| Do | α-Methoxy-3,4-dichlorophenyl-acetic acid | N-α-methoxy-3,4-dichloropheynlacetoxysuccinimide. |
| Do | α-Ethyl-phenoxyacetic acid | N-α-ethyl-phenoxyacetoxysuccinimide. |
| Do | 2-ethoxy-1-naphthoic acid | N-2-ethoxy-1-naphthoyloxysuccinimide. |
| Do | Thiophene-2-acetic acid | N-thiophene-2-acetoxysuccinimide. |
| Do | α-Methylphenoxyacetic acid | N-α-methyl-phenoxyacetoxysuccinimide. |
| Do | 2,4-dichlorophenoxyacetic acid | N-2,4-dichlorophenoxyacetoxysuccinimide. |
| Do | p-Chlorophenylacetic acid | N-p-chlorophenylacetoxysuccinimide. |
| Do | p-Methylbenzoic acid | N-p-methylbenzoyloxysuccinimide. |
| Do | 2-Naphthoic acid | N-2-naphthoyloxysuccinimide. |
| Do | β-5-nitro-2-furfuryl acrylic acid | N-β-5-nitro-2-furfurlyacrylyloxysuccinimide. |
| N-monochloroacetoxysuccinimide | Acetic acid | N-acetoxysuccinimide. |
| Do | Acrylic acid | N-acrylyloxysuccinimide. |
| Do | Crotonic acid | N-crotonyloxysuccinimide. |
| Do | Cyclohexanecarboxylic acid | N-cyclohexanoyloxysuccinimide. |
| Do | β-Cyclohexylacrylic acid | N-β-cyclohexylacrylyloxysuccinimide. |
| Do | Carbobenzoxyglycine | N-carbobenzoxyglycyloxysuccinimide. |
| Do | Carbobenzoxyvaline | N-carbobenzoxyvalyloxysuccinimide. |
| Do | Carbobenzoxy-D-phenylglycine | N-carbobenzoxy-D-phenylglycyloxysuccinimide. |
| Do | α-Methoxyisobutyric acid | N-α-methoxyisobutyloxysuccinimide. |
| Do | Phenylacetic acid | N-phenylacetoxysuccinimide. |
| Do | Capric acid | N-capryloxysuccinimide. |
| Do | Stearic acid | N-stearyloxysuccinimide. |
| Do | Cinnamic acid | N-cinnamoyloxysuccinimide. |
| Do | Isonicotinic acid | N-isonicotinoyloxysuccinimide. |

TABLE 1—Continued

| Compound (III)  $R_1-CO-O-N\begin{smallmatrix}CO-CH_2\\ \\CO-CH_2\end{smallmatrix}$ | Compound (IV)  $R_2-COOH$ | Compound (II)  $R_2-CO-O-N\begin{smallmatrix}CO-CH_2\\ \\CO-CH_2\end{smallmatrix}$ |
|---|---|---|
| Do | Benzoic acid | N-benzoyloxysuccinimide. |
| Do | Carbobenzoxy-L-phenylalanine | N-carbobenzoxy-L-phenylalanyloxysuccinimide. |
| Do | Carbobenzoxy-L-leucine | N-carbobenzoxy-L-leucyloxysuccinimide. |
| Do | Phenoxyacetic acid | N-phenoxyacetoxysuccinimide. |
| Do | α-Methoxy-3,4-dichlorophenyl-acetic acid | N-α-methoxy-3,4-dichlorophenylacetoxysuccinimide. |
| Do | α-Ethyl-phenoxyacetic acid | N-α-ethyl-phenoxyacetoxysuccinimide. |
| Do | 2-ethoxy-1-naphthoic acid | N-2-ethoxy-1-naphthoyloxysuccinimide. |
| Do | Thiophene-2-acetic acid | N-thiophene-2-acetoxysuccinimide. |
| Do | α-Methylphenoxyacetic acid | N-α-methyl-phenoxyacetoxysuccinimide. |
| Do | 2,4-dichlorophenoxyacetic acid | N-2,4-dichlorophenoxyacetoxysuccinimide. |
| Do | p-Chlorophenylacetic acid | N-p-chlorophenylacetoxysuccinimide. |
| Do | p-Methylbenzoic acid | N-p-methylbenzoyloxysuccinimide. |
| Do | 2-naphthoic acid | N-2-naphthoyloxysuccinimide. |
| Do | β-5-nitro-2-furfuryl acrylic acid | N-β-5-nitro-2-furfuryl acrylyloxysuccinimide. |
| N-α-monochloropropionyl succinimide | Acetic acid | N-acetoxysuccinimide. |
| Do | Acrylic acid | N-acrylyloxysuccinimide. |
| Do | Crotonic acid | N-crotonyloxysuccinimide. |
| Do | Cyclohexanecarboxylic acid | N-cyclohexanoyloxysuccinimide. |
| Do | β-Cyclohexylacrylic acid | N-β-cyclohexylacrylyloxysuccinimide. |
| Do | Carbobenzoxyglycine | N-carbobenzoxyglycyloxysuccinimide. |
| Do | Carbobenzoxyvaline | N-carbobenzoxyvalyloxysuccinimide. |
| Do | Carbobenzoxy-D-phenylglycine | N-carbobenzoxy-D-phenylglycyloxysuccinimide. |
| Do | α-Methoxyisobutyric acid | N-α-methoxyisobutyloxysuccinimide. |
| Do | Phenylacetic acid | N-phenylacetoxysuccinimide. |
| Do | Capric acid | N-capryloxysuccinimide. |
| Do | Stearic acid | N-stearyloxysuccinimide. |
| Do | Cinnamic acid | N-cinnamoyloxysuccinimide. |
| Do | Isonicotinic acid | N-isonicotinoyloxysuccinimide. |
| Do | Benzoic acid | N-benzoyloxysuccinimide. |
| Do | Carbobenzoxy-L-phenylalanine | N-carbobenzoxy-L-phenylalanyloxysuccinimide. |
| Do | Carbobenzoxy-L-leucine | N-carbobenzoxy-L-leucyloxysuccinimide. |
| Do | Phenoxyacetic acid | N-phenoxyacetoxysuccinimide. |
| Do | α-Methoxy-3,4-dichlorophenylacetic acid | N-α-methoxy-3,4-dichlorophenylacetoxysuccinimide. |
| Do | α-Ethyl-phenoxyacetic acid | N-α-ethyl-phenoxyacetoxysuccinimide. |
| Do | 2-ethoxy-1-naphthoic acid | N-2-ethoxy-1-naphthoyloxysuccinimide. |
| Do | Thiophene-2-acetic acid | N-thiophene-2-acetoxysuccinimide. |
| Do | α-Methylphenoxyacetic acid | N-α-methyl-phenoxyacetoxysuccinimide. |
| Do | 2,4-dichlorophenoxyacetic acid | N-2,4-dichlorophenoxyacetoxysuccinimide. |
| Do | p-Chlorophenylacetic acid | N-p-chlorophenylacetoxysuccinimide. |
| Do | p-Methylbenzoic acid | N-p-methylbenzoyloxysuccinimide. |
| Do | 2-naphthoic acid | N-2-naphthoyloxysuccinimide. |
| Do | β-5-nitro-2-furfuryl acrylic acid | N-β-5-nitro-2-furfuryl acrylyloxysuccinimide. |
| N-Formoxysuccinimide | Acetic acid | N-acetoxysuccinimide. |
| Do | Acrylic acid | N-acrylyloxysuccinimide. |
| Do | Crotonic acid | N-crotonyloxysuccinimide. |
| Do | Cyclohexanecarboxylic acid | N-cyclohexanoyloxysuccinimide. |
| Do | β-cyclohexylacrylic acid | N-β-cyclohexylacrylyloxysuccinimide. |
| Do | Carbobenzoxyglycine | N-carbobenzoxyglycyloxysuccinimide. |
| Do | Carbobenzoxyvaline | N-carbobenzoxyvalyloxysuccinimide. |
| Do | Carbobenzoxy-D-phenylglycine | N-carbobenzoxy-D-phenylglycyloxysuccinimide. |
| Do | α-Methoxyisobutyric acid | N-α-methoxyisobutyloxysuccinimide. |
| Do | Phenylacetic acid | N-phenylacetoxysuccinimide. |
| Do | Capric acid | N-capryloxysuccinimide. |
| Do | Stearic acid | N-stearyloxysuccinimide. |
| Do | Cinnamic acid | N-cinnamoyloxysuccinimide. |
| Do | Isonicotinic acid | N-isonicotinoyloxysuccinimide. |
| Do | Benzoic acid | N-benzoyloxysuccinimide. |
| Do | Carbobenzoxy-L-phenylalanine | N-carbobenzoxy-L-phenylalanyloxysuccinimide. |
| Do | Carbobenzoxy-L-leucine | N-carbobenzoxy-L-leucyloxysuccinimide. |
| Do | Phenoxyacetic acid | N-phenoxyacetoxysuccinimide. |
| Do | α-Methoxy-3,4-dichlorophenylacetic acid | N-α-methoxy-3,4-dichlorophenylacetoxysuccinimide. |
| Do | α-Ethyl-phenoxyacetic acid | N-α-ethyl-phenoxyacetoxysuccinimide. |
| Do | 2-ethoxy-1-naphthoic acid | N-2-ethoxy-1-naphthoyloxysuccinimide. |
| Do | Thiophene-2-acetic acid | N-thiophene-2-acetoxysuccinimide. |
| Do | α-Methylphenoxyacetic acid | N-α-methyl-phenoxyacetoxysuccinimide. |
| Do | 2,4-dichlorophenoxyacetic acid | N-2,4-dichlorophenoxyacetoxysuccinimide. |
| Do | p-Chlorophenylacetic acid | N-p-chlorophenylacetoxysuccinimide. |
| Do | p-Methylbenzoic acid | N-p-methylbenzoyloxysuccinimide. |
| Do | 2-naphthoic acid | N-2-naphthoyloxysuccinimide. |
| Do | β-5-nitro-2-furfuryl acrylic acid | N-β-5-nitro-2-furfurylacrylyloxysuccinimide. |

The following preparations illustrate several modes of preparing succinimide ester (II) in the present invention.

PREPARATION 1

N-acetoxysuccinimide 2 ml. of dimethylformamide were added to a mixture of 0.3 g. of acetic acid (5 mmole) and 1.7 g. of N-dichloroacetoxysuccinimide (7.5 mmole). With stirring at 0° C., 1.43 ml. of triethylamine were added dropwise thereto. After stirring for about further 2 hours at room temperature, pH was adjusted to 6–7 by adding 15 ml. of a mixture of water and 1 N-hydrochloric acid. The thus precipitated crystals were filtered off. The products: N-acetoxysuccinimide, colorless crystals.

Yield: 0.4 g. (recovery: 51%). M.P.: found: 131–133° C. reference: 130° C.

Elemental analysis.—Found (percent): C, 45.99; H, 4.63; N, 8.96. Theoretical as based upon $C_6H_7NO_4$ (percent): C, 45.86; H, 4.49; N, 8.91.

PREPARATION 2

N-carbobenzoxyglycyloxysuccinimide 2 ml. of tetrahydrofuran were added to a mixture of 1.05 g. of carbobenzoxyglycine (5 mmole) and 2.26 g. of N-dichloroacetoxysuccinimide (10 mmole). To this solution 1 ml. of triethylamine was added with stirring. The mixture was stirred for a further 1 hour at room temperature. After finishing the reaction, water was added, cooled, then filtered, and solid material recovered was washed with water. This material was dissolved in methylene chloride, and dried with anhydrous sodium sulfate. After removal of the drying agent by filtration, an addition of diethyl-ether resulted in the precipitation of N-carbobenzoxy-glycyloxysuccinimide as crystals.

Yield: 1.10 g. (recovery: 73%). M.P.: found: 115° C. references: 114° C.

Elemental analysis.—Found (percent): C, 54.95; H, 4.65; N, 9.31. Theoretical as based upon $C_{14}H_{14}N_2O_6$ (percent): C, 54.90; H, 4.57; N, 9.15.

PREPARATION 3

N-carbobenzoxyglycyloxysuccinimide

To a solution of 1.05 g. of carbobenzoxyglycine (5 mmole) and 2 g. of N-monochloroacetoxysuccinimide (ca. 10 mmole) in 1 ml. of tetrahydrofuran was added dropwise 1 ml. of trimethylamine (7.2 mmole) with stirring The reaction was allowed to continue for 2 hours. Following the reaction, the precipitated reaction product was filtered after addition of 25 ml. of water under cooling, then washed with water. The precipitated material was recrystallized from ethanol-ether mixture, yielding N-carbobenzoxyglycyloxysuccinimide as white crystals.

Yield: 750 mg. (recovery: 49%). M.P.: Found: 112.5–113.5° C. reference: 113–114° C.

PREPARATION 4

N-carbobenzoxyglycyloxysuccinimide

The triethylamine in Preparation 3, was replaced by pyridine to produce N-carbobenzoxyglycyloxysuccinimide as white crystals.

Yield: 342 mg. (recovery: 23%). M.P.: 111–113° C.

PREPARATION 5

8.4 ml. of triethylamine (60 mmole) were added dropwise to a cooled, stirred solution of 4.08 g. of phenylacetic acid (30 mmole) and 10.2 g. of N-dichloroacetoxysuccinimide (45 mmole) in 6 ml. of dimethylformamide. The solution was stirred for about 2 hours and then an excess amount of water was added. The reaction mixture was then allowed to stand overnight. After cooling the thus precipitated crystals were separated by filtration, washed with water repeatedly, yielding 5.55 g. of crude crystals of N-phenylacetoxysuccinimide (recovery: 79%), which was recrystallized as colorless crystals from ethyl ether.

Yield: 4.15 g. (recovery: 60%). M.P.: 118–119° C.

Elemental analysis.—Found (percent): C, 62.08; H, 4.85; N, 5.92. Theoretical as based upon $C_{12}H_{11}NO_{14}$ (percent): C, 61.80; H, 4.76; N, 6.01.

PREPARATION 6

N-capryloxysuccinimide 1.05 ml. of triethylamine were added dropwise with stirring to a cooled solution of 0.86 g. of n-capric acid (5 mmole) and 1.7 g. of N-dichloroacetoxysuccinimide (7.5 mmole) in 2 ml. of dimethylformamide. The mixture was then stirred in an ice bath for about one hour, and then 15 ml. chilled water was added. The reaction mixture was then cooled and the precipitated crystals were separated. This precipitated material was recrystallized from isopropyl alcohol-ethyl acetate mixture.

Yield: 500 mg. (recovery: 37%). M.P.: 59–61° C.

Elemental analysis.—Found (percent): C, 62.90; H, 9.10; N, 5.28. Theoretical as based upon $C_{14}H_{25}NO_4$ (percent): C, 62.44; H, 8.61; N, 5.20.

PREPARATION 7

N-carbobenzoxy-L-phenylalanyloxysuccinimide 1.05 ml. of triethylamine were added dropwise with cooling to a mixture of 1.2 g. of carbobenzoxy-L-phenyl-alanine (4 mmole) and 1.36 g. of N-dichloroacetoxysuccinimide (6 mmole) in 2 ml. of dimethylformamide. The mixture was stirred with cooling, followed by addition of 15 ml. of water, then the sedimented crystals were separated therefrom. N-carbobenzoxy-L-phenylalanyloxysuccinimide was recrystallized from isopropyl alcohol.

Yield: 670 mg. (recovery: 42%). M.P.: 130–133° C.

PREPARATION 8

N-stearyloxysuccinimide 1.05 ml. of triethylamine were added dropwise to a cooled, stirred mixture of 1.42 g. of stearic acid (5 mmole) and 1.7 g. of N-dichloroacetoxysuccinimide (7.5 mmole) in 6 ml. of dimethylformamide. The solution was stirred for about 1 hour with cooling, and then added with 24 ml. of water. The precipitated crystals of N-stearyloxysuccinimide were separated, which were finally recrystallized from isopropyl alcohol.

Yield: 1.16 g. (recovery: 61%). M.P.: 88–90° C.

Elemental analysis.—Found (percent): C, 69.62; H, 10.82; N, 3.94. Theoretical as based upon $C_{22}H_{39}NO_4$ (percent): C, 69.25; H, 10.30; N, 3.67.

PREPARATION 9

N-cinnamoyloxysuccinimide 1.43 ml. of triethylamine were added to a mixture of 0.7 g. of cinnamic acid (5 mmole) and 1.7 g. of N-dichloroacetoxysuccinimide (7.5 mmole) in 2 ml. of dimethylformamide, stirring for about 1 hour, followed by addition of 10 ml. of water. The solution was neutralized with 1 N-HCl and cooled, thereby separating the sedimented crystals and washed with water. The precipitated material was recrystallized from isopropyl alcohol-ethyl acetate.

Yield: 450 mg. (recovery: 37%). M.P.: 173–175° C.

Elemental analysis.—Found (percent): C, 62.40; H, 4.29; N, 5.47. Theoretical as based upon $C_{13}H_{11}NO_4$ (percent): C, 63.67; H, 4.53; N, 5.71.

PREPARATION 10

N-benzoyloxysuccinimide 1.05 ml. of triethylamine were added dropwise to a solution of 0.61 g. of benzoic acid (5 mmole) and 1.7 g. of N-dichloroacetoxysuccinimide (7.5 mmole) in 2 ml. of dimethylformamide. The solution was stirred for about 2 hours with cooling, adding 15 ml. of water, standing in an ice bath, and then separating the precipitated crystals of N-benzoyloxysuccinimide.

Yield: 500 mg. (recovery: 46%). M.P.: 133–135° C.

Elemental analysis.—Found (percent): C, 60.27; H, 4.19; N, 6.57. Theoretical as based upon $C_{11}H_9NO_4$ (percent): C, 60.27; H, 4.14; N, 6.39.

PREPARATION 11

N-carbobenzoxy-D-phenylglycyloxysuccinimide 1.05 ml. of triethylamine were added dropwise with stirring to a cooled solution of 1.43 g. of carbobenzoxy-D-phenylglycine (5 mmole) and 1.7 g. of N-dichloroacetoxysuccinimide (7.5 mmole) in 2 ml. of dimethylformamide. The solution was then stirred for 2 hours in an ice bath, adding an equal volume of chilled water and then precipitated crystals thus separated. The recrystallization was performed from isopropyl alcohol, thus obtained N-carbobenzoxy-D-phenylglycyloxysuccinimide as white needle crystals.

Yield: 610 mg. (recovery: 32%). M.P.: 144–146° C.

Elemental analysis.—Found (percent): C, 63.31; H, 4.86; N, 7.45. Theoretical as based upon $C_{20}H_{18}N_2O_6$ (percent): C, 62.82; H, 4.75; N, 7.33.

Compounds, which are represented by Formula II, formula $R_3$—$NH_2$ and compound having acid amide linkage as Formula I are shown in the following Table 2.

TABLE 2

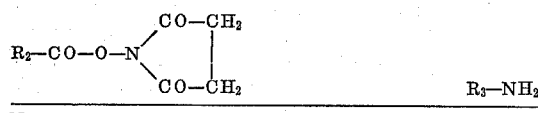

| Succinimide ester Compound (II) | $R_3$—$NH_2$ | Compound having acid amide linkage Compound (I) $R_2$—CO—NH—$R_3$ |
|---|---|---|
| N-carbobenzoyglycloxysuccinimide | Glycine ethyl ester | Carbobenzoxyglyclyglycine ethyl ester. |
| N-δ-carbobenzoxyaminovaleroyloxy-succinimide | δ-Aminovaleric acid methyl ester | δ-Carbobenzoxy aminovaleryl-δ-aminovaleric acid methyl ester. |
| N-carbobenzoxy-L-phenylalanyloxy-succinimide | Glycine ethyl ester | Carbobenzoxy-L-phenylalanyl-glycine ethyl ester |
| N-carbobenzoxy-L-leucyloxy-succinimide | do | Carbobenzoxy-L-leucylglycine ethyl ester. |
| Do | L-phenylalanyl glycine ethyl ester | Carbobenzoxy-L-leucyl-L-phenylalanyl-glycine ethyl ester. |
| N-phenylacetoxysuccinimide | 6-aminopenicillanic acid | Benzylpenicillin. |
| N-α-ethyl-phenoxyacetoxysuccinimide | do | Phenoxypropylpenicillin. |
| N-α-methoxy-3,4-dichlorophenylacetoxy-succinimide | do | 3,4-dichloro-α-methoxybenzylpenicillin. |
| N-2-ethoxy-1-naphthoyloxysuccinimide | do | 2-ethoxy-1-naphthylpenicillin. |
| N-thiophene-2-acetoxysuccinimide | 7-aminocephalosporanic acid | Cephalotin. |
| N-α-methyl-phenoxyacetoxysuccinimide | 6-aminopenicillanic acid | Phenoxyethylpenicillin. |
| N-carbobenzoxy-D-phenylglycyloxy-succinimide | do | α-Aminobenzylpenicillin. |
| N-acetoxysuccinimide | h-Hexylamine | N-n-hexylacetamide. |
| Do | Benzylamine | N-benzylacetamide. |
| Do | Allylamine | N-allylacetamide. |
| Do | 2-aminopyridine | N-2-pyridylacetamide. |
| Do | 4-amino-5-nitrothiazole | N-5-nitro-2-thiazoly acetamide. |
| Do | Phenylhydrazine | N-phenylaminoacetamide. |
| N-dichloroacetoxysuccinimide | p-Chloroaniline | N-p-chlorophenyldichloroacetamide. |
| N-propionyloxysuccinimide | Aniline | N-phenylpropionamide. |
| N-cyclohexanecarbonyloxysuccinimide | Cyclohexylamine | N-cyclohexylcyclohexane carboxamide. |
| N-phenylacetoxysuccinimide | Benzylamine | N-benzylphenylacetamide. |
| N-benzoyloxysuccinimide | p-Anisidine | N-p-methoxyphenylbenzamide. |
| N-phenylacetoxysuccinimide | Cyclohexylamine | N-cyclohexylphenylacetamide. |
| N-2,4-dichlorophenoxyacetoxy-succinimide | 3,4-dichloraniline | N-3,4-dichlorophenyl-2,4-dichloro-phenoxyacetamide. |
| N-p-chlorophenylacetoxysuccinimide | p-Chloroaniline | N-p-chlorophenyl-p-chlorophenylacetamide. |
| N-p-methylbenzoyloxysuccinimide | p-Toluidine | N-p-methylphenyl-p-methylbenzamide. |
| N-2-naphthoyloxysuccinimide | n-Butylamine | N-n-butyl-2-naphthamide. |
| N-2-naphthoyloxysuccinimide | β-Phenylethylamine | N-β-phenylethyl-2-naphthamide. |
| N-phenoxyacetoxysuccinimide | Benzylamine | N-benzylphenoxyacetamide. |
| N-acryloyloxysuccinimide | Isopropylamine | N-isopropylacrylamide. |
| N-isonicotinoyloxysuccinimide | 2-aminothiazole | N-2-thiazolylisonicotinamide. |
| N-β-5-nitro-2-furfurylacrylyloxy-succinimide | Benzylamine | N-benzyl-β-5-nitro-2-furfurylacrylamide. |
| N-phenylacetoxysuccinimide | Morpholine | N-phenylacetylmorpholine. |
| N-isonicotinoyloxysuccinimide | Isopropylhydrazine | N-isopropylaminoisonicotinamide. |
| N-p-chlorophenoxyacetoxysuccinimide | Phenylhydrazine | N-phenylamino-p-chlorophenoxyacetamide. |
| N-acetoxysuccinimide | p-Aminobenzoic acid ethyl ester | N-p-ethoxycarbonylphenylacetamide. |
| N-hippuroyloxysuccinimide | Aniline | Benzoylglycine anilide. |
| N-δ-chloropropionyloxysuccinimide | Benzylamine | N-benzyl-β-chloropropionamide. |

The compounds produced by the claimed process are useful as therapeutical agents for the treatment of various types of bacterial infections.

The following examples are set forth for purposes of illustration only and are not to be construed as limiting the scope of the invention.

EXAMPLE 1

Carbobenzoxyglycylglycine ethyl ester 1 ml. of triethylamine (7 mmole) was added dropwise to a cold solution of 1.05 g. of carbobenzoxyglycine (5 mmole) and 1.55 g. of N-dichloroacetoxysuccinimide (7 mmole) in 3 ml. of dimethylformamide. After 2 hours 0.07 ml. of water was added, stirring for several minutes, and then a mixture of 0.7 g. of glycine ethyl ester hydrochloride (5 mmole), 0.7 ml. of triethylamine (5 mmole), 3 ml. of dimethylformamide and 0.55 ml. of water was added thereto. The reaction was allowed to continue for 1 hour with stirring. After adding 20 ml. of chilled water, allowed to stand in an ice bath, the solution was extracted twice with ethyl acetate. This ethyl acetate extract was combined with additional ethyl acetate extract and the combined extracts containing the product were washed with 10% solution of sodium bicarbonate, 1 N-hydrochloric acid and water respectively, and dried over anhydrous sodium sulfate. After removal of the drying agent by filtration, the extract was dried up in vacuo. The residue was recrystallized from water containing ethanol to obtain crystals of carbobenzoxyglycine ethyl ester.

Yield: 1.08 g. (recovery: 73%). M.P.: Found: 81–80° C. reference: 80–81° C.

Elemental analysis.—Found (percent): C, 57.30; H, 6.21; N, 9.54. Theoretical as based upon $C_{24}H_{18}N_2O_5$ (percent): C, 57.21; H, 6.16; N, 9.52.

EXAMPLE 2

The procedure of Example 1 was again followed substantially in every detail except that the dimethylformamide was replaced by tetrahydrofuran to obtain the same product as crystals in Example 1.

Yield: 1.05 g. (recovery: 71%). M.P.: 80–82° C.

EXAMPLE 3

δ-carbobenzoxyaminovaleryl aminovaleric acid methyl ester 1 ml. of triethylamine was added dropwise with stirring to a cooled solution of 1.26 g. of δ-carbobenzoxyaminovaleric acid (5 mmole) and 1.58 g. of N-dichloroacetoxysuccinimide (7 mmole) in 3 ml. of dimethylformamide. The mixture was stirred in an ice bath for about 4 hours, followed by an addition of 0.07 ml. of water, and then kept in cooled condition for further 40 minutes. Next, the mixed solution of 0.85 g. of δ-aminovaleric acid methylester hydrochloride (ca. 5 mmole), 0.7 ml of triethylamine (5 mmole) and 4 ml. of dimethylformamide were added thereto with cooling, while stirring for 2.5 hours. The mixture was allowed to stand overnight, then added with 30 ml. of water and extracted with ethyl acetate. The ethyl acetate extract was washed with sodium bicarbonate solution, diluted with hydrochloric acid and water respectively and dried over anhydrous sodium sulfate. After removal of the drying agent by filtration, the extract was condensed in vacuo. The sedimented material was separated, washed with ether, dried in a desiccator, thus obtaining the product as white crystals.

Yield: 1.37 g. (recovery: 75%). M.P.: 94–96° C.

Elemental anaylsis.—Found (percent): C, 62.87; H, 7.83; N, 7.80. Theoretical as based upon $C_{19}H_{28}N_2O_5$ (percent): C, 62.62; H, 7.74; N, 7.69.

EXAMPLE 4

Carbobenzoxy-L-phenylalanylglycine ethyl ester 1.07 ml. of triethylamine were added dropwise with cooling to a mixture of 1.5 g. of carbobenzoxy-L-phenylalanine (5 mmole) and 1.96 g. of N-dichloroacetoxysuccinimide (7.5 mmole) in 3 ml. of dimethylformamide.

After 2 hours, 0.07 ml. of water was added with stirring for few minutes, further a mixed solution of glycine ethyl ester hydrochloride (5 mmole), 7 ml. of dimethylformamide and 0.7 ml. of triethylamine was added thereto and the mixture was stirred for further 2 hours.

After the reaction, 20 ml. of water was added and the mixture was extracted with ethyl acetate. The ethyl acetate phase was separated, washed with a 10%-solution of sodium bicarbonate, and diluted with hydrochloric acid and water, then dried with anhydrous sodium sulfate, followed by condensation in vacuo to obtain the product as white crystals.

Yield: 1.55 g. (recovery: 81%). M.P.: Found: 108–111° C. Reference: 110–111° C. Optical rotation: Found: $[\alpha]_D^{20} = -16.8°$ (c.=2.238, ethanol). Reference:

$$[\alpha]_D^{20} = -16.9°$$

Elemental analysis.—Found (percent): C, 66.30; H, 6.25; N, 7.33; Theoretical as based upon $C_{21}H_{24}N_2O_5$ (percent): C, 65.73; H, 6.19; N, 7.28.

EXAMPLE 5

Carbobenzoxy-L-leucylglycine ethyl ester 2.28 ml. of triethylamine were added dropwise with stirring to a cold mixture of 2.65 g. of carbobenzoxy-L-leucine (10 mmole) and 3.39 g. of N-dichloroacetoxysuccinimide (15 mmole) in 3 ml. of dimethylformamide. The mixture was stirred for 3 hours, and then added with 0.14 ml. of chilled water with continuous cooling and stirring. To this solution, a mixture of 1.39 g. of glycine ethyl ester hydrochloride (10 mmole), 14 ml. of dimethylformamide and 1.43 ml. of triethylamine was added. This reaction mixture was then stirred for further 3 hours. After adding chilled water, the solution was extracted twice with ethyl acetate and the extract containing the product was washed with diluted hydrochloric acid, sodium bicarbonate solution and water successively, and dried over anhydrous sodium sulfate. After removal of the drying agent by filtration, the ethyl acetate layer was evaporated at a reduced pressure so as to precipitate the product which was finally recrystallized from ethyl acetate/petroleum ether.

Yield: 1.60 g (recovery: 55.1%). M.P.: 98–100° C. Optical rotation: $[\alpha]_D^{20} = -25.5$ (c=2.08, ethanol).

Elemental analysis.—Found (percent): C, 62.38; H, 7.88; N, 8.06. Theoretical as based upon $C_{16}H_{25}N_2O_5$ (percent): C, 61.90; H, 7.45; N, 8.01.

EXAMPLE 6

Carbobenzoxy-L-phenylalanylglycine ethyl ester

N-dichloroacetoxysuccinimide in Example 4 was replaced by N-monochloroacetoxysuccinimide to produce crystals of carbobenzoxy-L-phenylalanylglycine ethyl ester.

Yield: 34%. M.P.: 111° C. Optical rotation:

$$[\alpha]_D^{24} = -16.1$$

(c.=1.646, ethanol).

EXAMPLE 7

Benzylpenicillin procaine 0.4 ml. of triethylamine (3 mmole) was added to a cooled solution of 0.23 g. of N-phenylacetoxysuccinimide (1 mmole), prepared in accordance with the aforementioned Preparation 5, and 0.21 g. of 6-aminopenicillanic acid (1 mmole) in 3.6 ml. of dimethylformamide. The solution was stirred for about 3 hours at room temperature, and then poured into ice water, adjusting the pH to 2 by addition of 1 N-hydrochloric acid. This solution was extracted with methyl isobutyl ketone and the methyl isobutyl ketone layer was separated. This extract was washed with 0.01 N-hydrochloric acid, then extracted twice with 1 ml. of 1 molar sodium bicarbonate solution and once with 0.5 ml. of the said solution. To the extracts combined together containing the product, benxylpenicillin, there was added 0.27 g. of procaine hydrochloride and cooled in an ice water bath, to precipitate benzylpenicillin procaine as white crystals, which were washed then with ethanol and diethyl ether, dried in vacuo, and found to contain β-lactam group upon infrared analysis and to have an activity of 1000 units/mg.

Yield: 400 mg. (recovery: 70%). M.P.: 124–125° C. (dec.).

Elemental analysis.—Found (percent): C. 59.22; H, 6.92; N, 9.90; S, 5.21. Theoretical as based upon $$C_{16}H_{18}N_2O_4S \cdot C_{12}H_{20}N_2O_2 \cdot H_2O$$

(percent): C, 59.17; H, 6.85; N, 9.52; S, 5.54.

EXAMPLE 8

Benzylpenicillin procaine 0.28 ml. of triethylamine was added dropwise with stirring to a cold solution of 0.34 g. of N-dichloroacetoxysuccinimide (1.5 mmole) and 0.136 g. of phenylacetic acid (1.0 mmole) in 3 ml. of dimethylformamide. The mixture was stirred for about 2 hours in an ice water bath and then added with 0.04 ml. of water, followed by continuous agitation. Next, a solution of 0.15 g. of 6-aminopenicillanic acid (0.7 mmole) in 0.28 ml. of triethylamine and 1.5 ml. of dimethylformamide was added thereto. The mixture was stirred at room temperature for 3.5 hours. After adjusting the pH to 2.0 and pouring into ice water containing 3 mmole of hydrochloric acid, the solution was extracted with methyl isobutyl ketone. The methyl isobutyl ketone layer was washed with diluted hydrochloric acid and extracted with 1 mole of aqueous sodium bicarbonate solution. Adding 0.19 g. of procaine hydrochloride to this extract, the precipitated product formed by cooling was filtered, washed with water, ethanol and diethyl ether, respectively, dried and thus obtained crystals of benzylpenicillin procaine. Recovery: 63%.

EXAMPLE 9

α-carbobenzoxyaminobenzylpenicillin dibenzylethylenediamine 11.2 ml. of triethylamine (0.08 mole) were added dropwise to an ice-cold solution of 13.6 g. of N-dichloroacetoxysuccinimide (0.06 mole) and 11.4 g. of α-carbobenzoxyaminophenylacetic acid (0.04 mole) in 30 ml. of dimethylformamide. The reaction continued for about 3.5 hours at room temperature, then the reaction mixture was extracted with 250 ml. of ethyl acetate and washed successively with water, 1 N-sodium bicarbonate solution, 1 N-hydrochloric acid and water.

The ethyl acetate layer was dried with anhydrous sodium sulfate. After drying agent was removed by filtration, the ethyl acetate layer was evaporated under reduced pressure. The residue was dissolved in 30 ml. of dimethylformamide, followed by addition of 8.64 g. of 6-aminopenicillanic acid (0.04 mole) and further by dropwise addition of 16.8 ml. of triethylamine (0.12 mole) with cooling in ice. The resulting clear solution was allowed to warm up to room temperature and to continue the reaction for 2.5 hours, then adjusted the pH to 2 and extracted with 300 ml. of methyl isobutyl ketone. The extract was washed with water, followed by adjusting of the pH to 7 by addition of 1 N-sodium bicarbonate solution and of dropwise addition of 7.2 g. of dibenzylethylenediamine diacetate in water. After precipitation the product was recovered by filtration, washed with water, dried over phosphorus pentoxide in vacuo to give, N,N'-dibenzylethylenediamine salt of α-carbobenzoxy aminobenzyl penicillin. M.P.: 127–158° C. (dec.).

Elemental analysis.—Found (percent): C, 64.22; H, 6.07; N, 9.02. Theoretical as based upon $$(C_{24}H_{25}N_3O_6S)_2 \cdot C_{14}H_{20}N_2$$

(percent): C, 63.68; H, 5.80; N, 9.29.

EXAMPLE 10

N,N'-dibenzylethylenediamine phenoxymethylpenicillin 16.8 ml. of triethylamine (0.12 mole) were added dropwise to an ice cold solution of 9.12 g. of phenoxyacetic acid (0.06 mole) and 20.4 g. of N-dichloroacetoxysuccinimide (0.09 mole) in 50 ml. of dimethylformamide. The mixture was stirred for 1.5 hours and then the solution was extracted with 100 ml. of ethyl acetate, which is followed by successive washing with 1 N-sodium bicarbonate solution, 1 N-hydrochloric acid and water. After the ethyl acetate layer was dried, it was concentrated and the residue was recrystallized from isopropyl alcohol to give 9.0 g. of N-phenoxyacetoxysuccinimide (recovery: 60%).

Next, the reaction was continued under cooling for about 2.5 hours with dropwise addition of 12.6 g. of triethylamine (0.09 mole) to a solution of 7.49 g. of N-phenoxyacetoxysuccinimide (0.03 mole) and 6.48 g. of 6-aminopenicillanic acid (0.03 mole) in 100 ml. of dimethylformamide. The solution was adjusted to pH 2.0, extracted with 150 ml. of methyl isobutyl ketone, and followed by extraction with 1 N-sodium bicarbonate solution. The extract was adjusted to pH 7 and lyophilized. 10 g. of N,N'-dibenzylethylenediamine diacetate solution were added to 11.7 g. of this lyophilized powder and filtered and the precipitate was washed with water, dried in vacuo to give N,N'-dibenzylethylenediamine phenoxymethylpenicillin (recovery: 60%). M.P. 95–97° C.

Elemental analysis.—Found (percent): C, 59.01; H, 5.89; N, 8.25. Theoretical as based upon $$(C_{16}H_{18}N_2O_5S)_2 \cdot C_{16}H_{20}N_2$$

(percent): C, 61.30; H, 5.96; N, 8.95.

EXAMPLE 11

N,N'-dibenzylethylenediamine phenoxyethylpenicillin

In the process of Example 10, the phenoxyacetic acid was replaced by phenoxypropionic acid to produce N,N'-dibenzylethylenediamine phenoxyethylpenicillin (recovery: 62.5%). M.P.: 93–100° C.

Elemental analysis.—Found (percent): C, 60.61; H, 6.20; N, 8.28. Theoretical as based upon $$(C_{17}H_{20}N_2O_5S)_2 \cdot C_{16}H_{20}N_2$$

(percent): C, 60.83; H, 6.19; N, 8.67.

EXAMPLE 12

N,N'-dibenzylethylenediamine phenoxypropylpenicillin

In an Example 10 the phenoxyacetic acid was replaced by phenoxybutyric acid to produce N,N'-dibenzylethylenediamine phenoxypropylpenicillin (recovery: 50.3%).

Elemental analysis.—Found (percent): C, 63.10; H, 6.38; N, 8.82. Theoretical as based upon $$(C_{18}H_{22}N_2O_5S)_2 \cdot C_{16}H_{20}N_2$$

(percent): C, 62.63; H, 6.42; N, 8.43.

EXAMPLE 13

In the process of Example 10, the dichloroacetoxysuccinimide and phenoxyacetic acid were replaced by monochloroacetoxysuccinimide and phenoxybutyric acid respectively to produce the same product as obtained in Example 12.

EXAMPLE 14

N,N'-dibenzylethylenediamine-3-(o-chlorophenyl)-5-methyl-4-isoxazolylpenicillin 14.0 ml. of triethylamine (0.1 mole) were added dropwise under ice cooling to a solution of 11.85 g. of 3-(o-chlorophenyl)-5-methyl-4-isoxazol carboxylic acid (0.05 mole) and 17.0 g. of N-dichloroacetoxysuccinimide (0.075 mole) in 30 ml. of dimethylformamide. The mixture was reacted with stirring in an ice water bath for 1 hour and then at room temperature for 3 hours. The solution was extracted twice with total 300 ml. of ethyl acetate, subsequently washed with water, 1 N-sodium bicarbonate solution, 1 N hydrochloric acid and water, respectively. The washed solution was dried over anhydrous sodium sulfate.

After removal of the drying agent by filtration, the ethyl acetate layer was evaporated in vacuo and the residue was dissolved in 25 ml. of dimethylformamide, to which is added then 6.5 g. of 6-aminopenicillanic acid (0.03 mole) and 2.45 g. of 2-methylimidazole under cooling to react with each other for 3 hours. The reacted solution was allowed to stand overnight at room temperature, adjusted to pH 2.0 in an ice water bath and extracted with 100 ml. of diethyl ether. The ether solution was then extracted with 30 ml. of 1 N-sodium bicarbonate solution and 5.4 g. of N,N'-dibenzylethylenediamine diacetate in water was added thereto. After cooling off the reaction mixture, the filtered precipitate was washed with water and dried to obtain N,N' - dibenzylethylenediamine- 3-(o-chlorophenyl)-5-methylisoxazolylpenicillin.

Yield: 7.7 g. (recovery: 45%). M.P.: 55–64° C.

Elemental analysis.—Found (percent): C, 58.25; H, 5.46; N, 9.55; Cl, 6.34. Theoretical as based upon $(C_{19}H_{18}N_3O_5SCl)_2 \cdot C_{16}H_{20}N_2$ (percent): C, 58.33; H, 5.04; N, 10.08; Cl, 6.39.

EXAMPLE 15

N,N'-dibenzylethylenediamine α-methoxy-3,4-dichlorobenzylpenicillin

In the process of Example 10, the phenoxyacetic acid was replaced by α-methoxy-3,4-dichlorophenylacetic acid to produce N,N'-dibenzylethylenediamine α-methoxy-3-4-dichlorobenzylpenicillin. (Recovery: 45%.)

Elemental analysis.—Found (percent): C, 56.08; H, 5.23; N, 5.31; Cl, 13.42. Theoretical as based upon $(C_{17}H_{18}NO_5SCl_2)_2 \cdot C_{16}H_{20}N_2$ (percent): C, 55.65; H, 5.19; N, 5.19; Cl, 13.15.

EXAMPLE 16

N,N'-dibenzylethylenediamine 2-ethoxy-1-naphthylpenicillin

In the process of Example 14, 3-(o-chlorophenyl)-5-methyl-4-isoxazole carboxylic acid was replaced by 2-ethoxy-1-naphthoic acid to produce N,N'-dibenzylethylenediamine 2 - ethoxy - 1-naphthylpenicillin. (Recovery: 41.0%.)

Elemental analysis.—Found (percent): C, 66.38; H, 6.11; N, 6.66. Theoretical as based upon $$(C_{21}H_{22}N_2O_5S)_2 \cdot C_{16}H_{20}N_2$$

(percent): C, 65.89; H, 6.05; N, 6.81.

EXAMPLE 17

N,N'-dibenzylethylenediamine 6-(carbobenzoxyglycyl) aminopenicillanic acid

In the process of Example 10, the phenoxyacetic acid was replaced by carbobenzoxyglycine to produce N,N'-dibenzylethylenediamine - 6 - (carbobenzoxyglycyl)-aminopenicillanic acid. (Recovery: 70.7%.)

Elemental analysis.—Found (percent): C, 58.34; H, 5.95; N, 10.87. Theoretical as based upon $$(C_{18}H_{21}N_3O_6S)_2 \cdot C_{16}H_{20}N_2$$

(percent): C, 59.19; H, 5.88; N, 10.62.

EXAMPLE 18

N,N'-dibenzylethylenediamine 6-(carbobenzoxyphenylalanyl)-aminopenicillanic acid In the process of Example 10, phenoxyacetic acid was replaced by carbobenzoxyphenylalanine to produce N,N'-dibenzylethylenediamine - 6-(carbobenzoxyphenylalanyl)-aminopenicillanic acid. (Recovery: 72.3%.)

Elemental analysis.—Found (percent): C, 64.69; H, 6.06; N, 9.00. Theoretical as based upon $$(C_{25}H_{27}N_3O_6S)_2 \cdot C_{16}H_{20}N_2$$

(percent): C, 64.17; H, 5.99; N, 9.07.

EXAMPLE 19

N,N'-dibenzylethylenediamine-6-(carbobenzoxyseryl)-aminopenicillanic acid

In the process of Example 10, the phenoxyacetic acid was replaced by carbobenzoxyserine to produce N,N'-dibenzylethylenediamine 6-(carbobenzoxyseryl)-aminopenicillanic acid. (Recovery: 60.7%.)

Elemental analysis.—Found (percent): C, 57.71; H, 6.17; N, 9.93. Theoretical as based upon $$(C_{19}H_{24}N_3O_7S)_2 \cdot C_{16}H_{20}N_2$$

(percent): C, 58.05; H, 6.09; N, 10.03.

EXAMPLE 20

N,N'-dibenzylethylenediamine-6-(carbobenzoxyalanyl)-aminopenicillanic acid

In the process of Example 10, the phenoxyacetic acid was replaced by carbobenzoxyalanine to produce N,N'-dibenzylethylenediamine 6-(carbobenzoxyalanyl)-aminopenicillanic acid. (Recovery: 75.8%.)

Elemental analysis.—Found (percent): C, 60.45; H, 6.01; N, 10.61. Theoretical as based upon $$(C_{19}H_{23}N_3O_6S)_2 \cdot C_{16}H_{20}N_2$$

(percent): C, 59.87; H, 6.09; N, 10.34.

EXAMPLE 21

N,N'-dibenzylethylenediamine-6-myristoylaminopenicillanic acid

In the process of Example 10, the phenoxyacetic acid was replaced by myristic acid to produce N,N'-dibenzylethylenediamine-6-myristoylaminopenicillanic acid. (Recovery: 55.4%.)

Elemental analysis.—Found (percent): C, 65.88; H, 8.03; N, 7.59. Theoretical as based upon $$(C_{22}H_{38}N_2O_4S)_2 \cdot C_{16}H_{20}N_2$$

(percent): C, 66.53; H, 7.94; N, 7.76.

EXAMPLE 22

N,N'-dibenzylethylenediamine-6-lauroylaminopenicillanic acid

In the process of Example 10, the phenoxyacetic acid was replaced by lauric acid to produce N,N'-dibenzylethylenediamine-6-aminopenicillanic acid. (Recovery: 62.0%.)

Elemental analysis.—Found (percent): C, 65.33; H, 8.53; N, 7.94. Theoretical as based upon $$(C_{20}H_{34}N_2O_4S)_2 \cdot C_{16}H_{20}N_2$$

(percent): C, 64.85; H, 8.49; N, 8.10.

EXAMPLE 23

N,N'-dibenzylethylenediamine-6-caproylaminopenicillanic acid

In the process of Example 10, the phenoxyacetic acid was replaced by caproic acid to produce N,N'-dibenzylethylenediamine-6 - caproylaminopenicillanic acid. (Recovery: 58.0%.)

Elemental analysis.—Found (percent): C, 61.38; H, 7.44; N, 9.48. Theoretical as based upon $$(C_{14}H_{22}N_2O_4S)_2 \cdot C_{16}H_{20}N_2$$

(percent): C, 60.81; H, 7.37; N, 9.67.

We claim:

1. A process for the production of a compound having an acid amide linkage, said compound having the general formula:

$$R_2—CO—NH—R_3$$

wherein:
R₂ is a member selected from the group consisting of α-lower alkyl-, phenyl- and benzyl-α-amino acetic acid residues N-protected with carbobenzoxy groups, benzyl, phenoxymethyl, phenoxyethyl, phenoxypropyl, 3-(o-chlorophenyl)-5-methyl-4-isoxazoyl, α-methoxy-3,4-dichlorobenzyl and 2-ethoxy - 1 - naphthyl; and R₃ is a penicillanic acid residue, said process comprising:
reacting in an inert organic solvent at a temperature of from about 0° C. to room temperature, a first compound having the general formula:

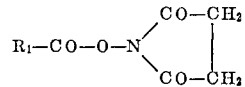

wherein R₁ is a member selected from the group consisting of a monochloromethyl and a dichloromethyl group, with a second compound having the following general formula:

$$R_2—COOH$$

wherein R₂ has the same meaning as hereinbefore described, wherein the molar ratio of said first compound to said second compound is from about 1.4 to about 2 moles of said first compound per 1 mole of said second compound, said reaction being conducted in the presence of from about 1.5 to about 2.1 moles of a tertiary organic amine per 1 mole of said second compound to yield a succinimide ester compound having the general formula

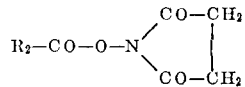

wherein R₂ has the meaning hereinbefore described; and subsequently reacting said succinimide compound with an amino compound in a ratio of from 1 to 2 moles of said succinimide compound per 1 mole of said amino compound, said amino compound being represented by the following general formula:

$$R_3—NH_2$$

said reaction being conducted in the presence of from 1 to 3 moles of a tertiary organic amine per 1 mole of said amino compound wherein R₃ has the same meaning hereinbefore described in said inert organic solvent at a temperature of from about 0° C. to room temperature to thereby yield the desired product expressed by said initial formula.

References Cited

UNITED STATES PATENTS 2,518,156  8/1950  Magat _____ 260—78
3,317,559  5/1967  Anderson _____ 260—326.3

OTHER REFERENCES

Wolman, Israel, J. Chem., 5, 231–236 (1967).
Sakakibara et al. I, Bull. Chem. Soc. Jap., 37, 1231–1232 (1964).
Sakakibara et al. II, Bull. Chem. Soc. Jap., 38, 1979–1984 (1965).

LEWIS GOTTS, Primary Examiner

M. KASSENOFF, Assistant Examiner

U.S. Cl. X.R.

260—112.5, 243, 247.2, 295, 302, 326.3, 347.3, 471, 557, 558, 559, 561, 562